June 5, 1934.

S. BRÜCK

Re. 19,191.

GRIPPING DEVICE

Original Filed April 28, 1932 2 Sheets-Sheet 1

INVENTOR
Stephan Brück
BY
Warfield & Brown
ATTORNEYS

June 5, 1934.

S. BRÜCK

Re. 19,191

GRIPPING DEVICE

Original Filed April 28, 1932 2 Sheets-Sheet 2

INVENTOR
Stephan Brück
BY
Warfield & Brown
ATTORNEYS

Reissued June 5, 1934 Re. 19,191

UNITED STATES PATENT OFFICE 19,191

GRIPPING DEVICE

Stephan Brück, Berlin, Germany

Original No. 1,912,251, dated May 30, 1933, Serial No. 608,106, April 28, 1932. Application for reissue December 12, 1933, Serial No. 702,024. In Germany April 30, 1931

11 Claims. (Cl. 279—2)

The invention relates to a gripping device and more specifically to a chuck for gripping the periphery of objects. It may be used with lathes and similar machines. It is adapted to support hollow articles having an inner periphery or to engage shafts in connection with friction clutches.

Chucks for gripping the inner surfaces of hollow articles have been known where the object to be tooled was held by means of eccentric pawls or cylinders guided on outwardly-spreading faces and where, in consequence of the resistance imparted to the object, the automatic gripping of the latter was performed.

In all these devices one or more intermediate parts have been provided which transmitted the pressing effect of the pawls or cylinders to the work. Similarly special parts have been arranged to operate such guiding of the pawls on cylinders as is necessary for centering the work.

This invention avoids all these intermediate and auxiliary parts. For the centering and gripping of the work a plurality of movable clamps only are used which are provided with contacts moving against each other and with friction faces eccentric with respect to the clamps. The clamps may also be provided with centering faces which move against each other. The head with which the clamps are associated serves only as a mounting means.

For a fuller understanding of the nature and objects of the invention reference should be had to the following detail description taken in connection with the accompanying drawings, in which.

Figure 1:
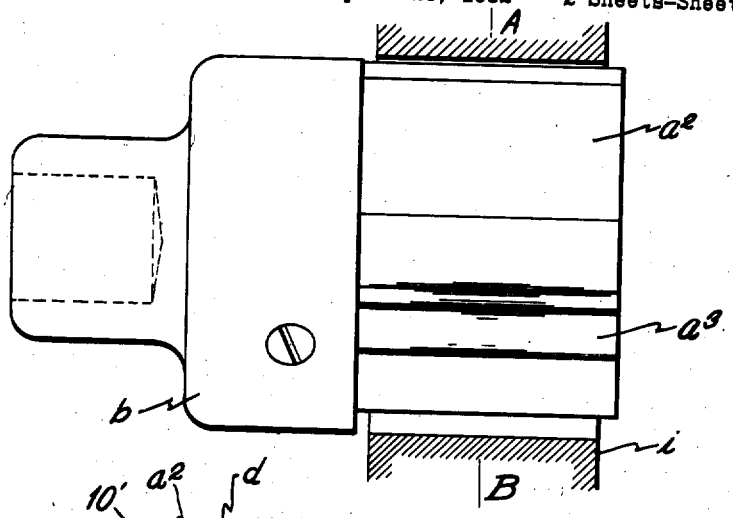
Fig. 1 is a view of a device embodying one form of the invention, the object being operated upon being shown in section.

In the drawings A1, A2 and A3 are elements mounted on a head *b*. This head may be supplied in any customary way with a thread or flange for receiving the spindle head of a lathe or with a simple bore for the reception of a shaft end. The relative movement of the clamps, with respect to the head, may be in any convenient manner. For example, they may be pivoted to the head *b* by pivots *e*.

The plurality of movable elements are constructed in general similarly. Each may be pivotally mounted so as to oscillate back and forth. Each has an article-gripping means associated with it which may take the form of a face *c* of the element, eccentric with the center of oscillation of the element. Each has at least one means associated with it which contacts with a contour *d* on one of the other elements. As shown in the drawings, this is a point 10 integral with the element and extending outward therefrom. The actual contact may be made in any usual mechanical fashion, that shown being a simple sliding contact. The movable elements may each be further provided with a surface *k*. The movable elements, of which there may be three, are arranged with their faces *k* toward each other in such a way that each rolls upon the faces *k* of those elements adjacent. A very simple arrangement is where the faces *k* are arcs of circles about the pivots *e* of their respective elements and where the pivots lie on a circle around a predetermined point about which it is desired to center the work. The faces *k* and the contours *d* may be cylindrical.

Means may be provided for constraining the clamps to tend to move in a given direction. These means may be resilient and may be ring-shaped springs *f*, which are fastened on one end by a pin *g* to the head *b* and on the other end by a pin *h* to the pivot *e*. The clamps are thereby urged to turn in the direction of the arrow *p*2. When the clamps are turned in that direction, the diameter of the circle, on the circumference of which the eccentrically-arranged gripping faces are located, is increased and the work *i* is engaged. When turned in the opposite direction the diameter is decreased.

In general, each contour *d*, which partakes of the nature of a cam, is so shaped that, as the point 10 of the adjacent clamp moves, the cam *d* in contact therewith moves its clamp an amount sufficient to keep the gripping face of the latter concentric with the gripping face associated with the point 10. A simple arrangement of the parts where the gripping faces for one given position of two adjacent clamps are equidistant from the desired center is where the pivots are on a circle about that point and each gripping face is at the same distance from its pivot and also at the same angular displacement from its pivot as measured about said central point. Then it is only necessary, in order to maintain the gripping faces equidistant from the central point, that the clamps have identical angular displacement. In order that they be identical the curve of the contour *d* may be the arc of a circle convex with respect to the point 10. If the point 10 happens to be displaced from the center of oscillation, i. e., of the pivot, of its clamp a distance 2*r* equal to the distance between the pivots of the two adjacent clamps, the contour may be an arc of a circle whose radius is 2*r* and the center of which is at a perpendicular distance *r* times the square root of three from a line between the pivots extended.

Figure 2:
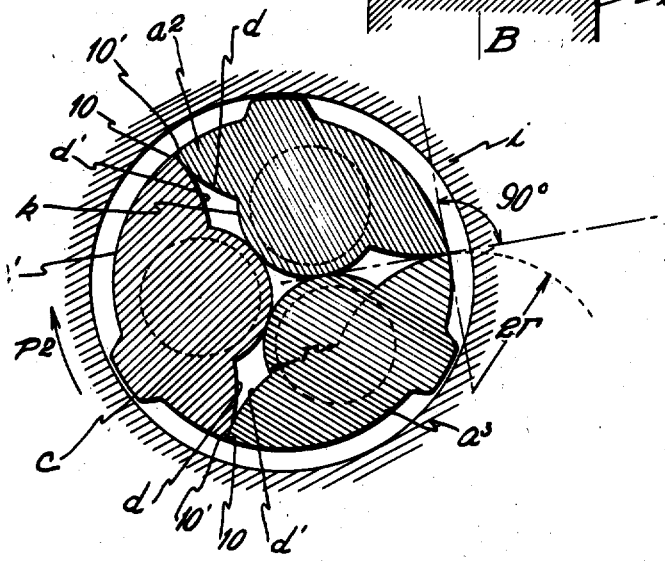
Fig. 2 is a cross section of the device shown in Fig. 1 taken along the line A—B.
Figure 4:
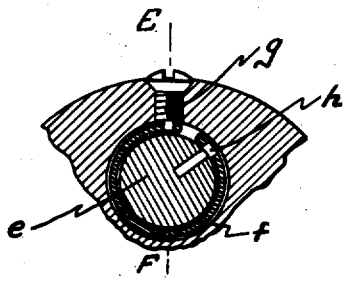
Fig. 4 is a view in cross section of that type of control means shown in Fig. 3 and taken along the line C—D.
Figure 3:
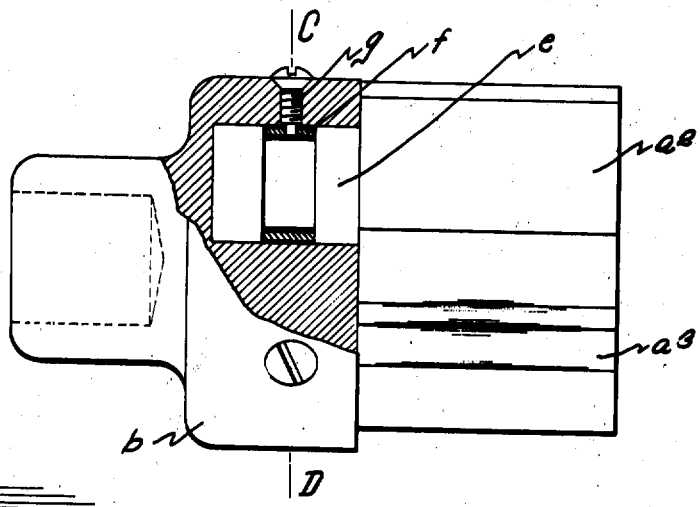
Fig. 3 is a view of the device shown in Fig. 1, one type of means tending to control the operation of the device being shown in cross section.
Figure 6:
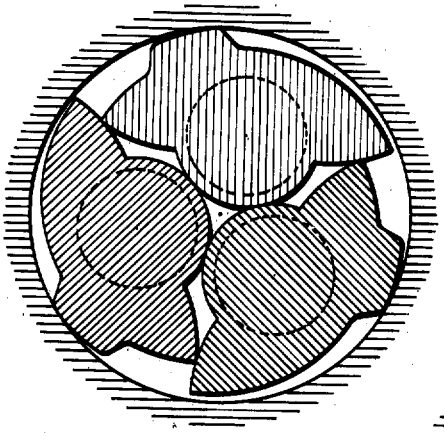
Fig. 6 is a view in cross section, similar to Fig. 2, and wherein the gripping means are in contact with an object of smaller inner periphery.
Figure 5:
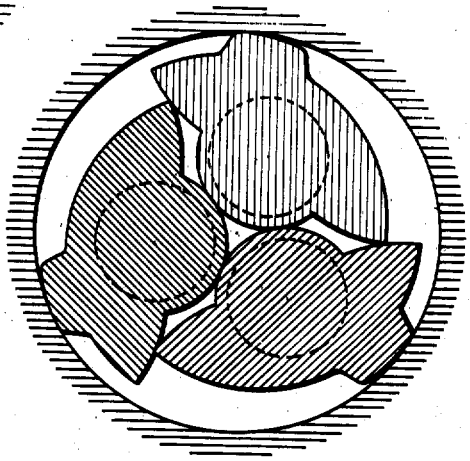
Fig. 5 is a view in cross section, similar to Fig. 2, and wherein the gripping means are in contact with an object of larger inner periphery.

The geometric construction of a device having these particular dimensions is shown in Fig. 2. By the contours *d* the clamps are drivingly connected with each other in such a way that the angular displacements of the clamps is substantially the same in size and direction. This results in the gripping faces *c* always being concentric; therefore the work is maintained concentric to a predetermined point in or to the middle line of the head or to that of the spindle head of the lathe.

The foregoing has described a clamp as driven by a point 10 on an adjacent driving clamp. The driven clamp may also be provided with a point 10′, which moves along a contour *d′* on the driving clamp. In such a case the latter is driven by the former in those positions in which 10′ is in contact with *d′*. The points 10 and 10′ may be at the end, on each clamp, of the contours *d′* and *d*, respectively, so that in a continuous operation of the device two adjacent clamps are successively the driving and the driven, or vice versa, elements as respects each other.

At rest, or where there is no work present, the gripping-faces *c* may be pressed outwards by the ring springs *f*. The work is pushed on the clamps right up to the head by slightly turning it in the direction against the arrow *p*2; to assist this the gripping-faces *c* are slightly tapered towards their front ends. After releasing the work this is kept in an accurate central position in consequence of the turning movement of the clamps, which may be effected by springs. If now the tool cuts into the work and tends to push it in the direction of the arrow *p*2 in consequence of the friction the gripping-faces are dragged along and pressed outwards. The greater the resistance which is exerted by the work on the tool, the more is the pressure of the gripping-faces on the work.

In the gripping process only the clamps are engaged. A device, as shown, embodying only three clamping elements has been found efficient.

The gripping-clamps are strained by pressure forces only in a direction right angular to their longitudinal axis, so that alterations of shape in the gripping device or a lessening of the gripping action are prevented. By this an absolute reliable gripping of the work is ensured. The pivots, the ring springs and the head in no way are engaged in the actual process.

As there are no special parts of the centering, there is no danger of losing the centering accuracy which might arise from the wearing away of such parts.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a device of the character described, the combination comprising mounting means, a plurality of elements mounted and adapted to rotate thereon, means adapted to rotate with each of said elements and in contact with a contour of another of said elements whereby the movements of said elements are interrelated, and article-gripping means associated with each of said plurality and adapted for gripping an object other than said mounting means and eccentrically positioned with respect to the axis of rotation of the respective elements.

2. In a device of the character described, the combination comprising mounting means, a plurality of elements pivotally mounted and adapted to rotate thereon, means adapted to rotate with each of said elements and in contact with a contour of another of said elements whereby the movements of said elements are interrelated, and article-gripping means associated with each of said plurality and adapted for gripping an object other than said mounting means and eccentrically positioned with respect to the axis of rotation of the respective elements.

3. In a device of the character described, the combination comprising mounting means, a plurality of elements mounted and adapted to rotate thereon, means adapted to rotate with each of said elements and in contact with a contour of another of said elements whereby the movements of said elements are interrelated, article-gripping means associated with each of said plurality and adapted for gripping an object other than said mounting means and eccentrically positioned with respect to the axis of rotation of the respective elements, and means, independent of the article gripped, tending to move said elements in a predetermined direction.

4. In a device of the character described, the combination comprising mounting means, a plurality of elements pivotally mounted and adapted to rotate thereon, means adapted to rotate with each of said elements and in contact with a contour of another of said elements whereby the movements of said elements are interrelated, and article-gripping means respectively associated with said elements and eccentrically positioned with respect to the axis of rotation of the respective elements, said contour being so shaped and said gripping means being so eccentrically located that said gripping means always determine a circle about a predetermined point.

5. In a device of the character described, the combination comprising mounting means, a plurality of elements mounted and adapted to rotate thereon, means associated and adapted to rotate with each of said elements and in contact with a contour of another of said elements whereby the movements of said elements are interrelated and article-gripping means respectively associated with, and eccentrically positioned with respect to the axis of rotation of, each of said plurality, said contour being so shaped and said gripping means being so eccentrically located that said gripping means always determine a circle of variable radius about a predetermined point.

6. In a device of the character described, the combination comprising mounting means, a plurality of elements mounted and adapted to rotate thereon about a center of rotation, means adapted to rotate with each of said elements and in contact with a contour of another of said elements whereby the movements of said elements are interrelated, and article-gripping means respectively associated with said elements and eccentrically positioned with respect to the axis of rotation of the respective elements, and for a predetermined position concentrically with each other about a predetermined point, each of said contacting means being spaced from its center of rotation a distance equal to the distance between its center of rotation and the center of rotation of the element with which it contacts, and said contour being an arc of a circle having a radius equal to said distance.

7. In a device of the character described, the combination comprising mounting means, a plurality of elements mounted and adapted to rotate thereon, means adapted to rotate with each of said elements and in contact with a contour of another of said elements whereby the movements of said elements are interrelated, and article-gripping means respectively associated with said elements and eccentrically positioned with respect to the axis of rotation of the respective elements, and for a predetermined position concentrically with each other about a predetermined point, the contour being an arc of a circle.

8. In a device of the character described, the combination comprising mounting means, a plurality of elements pivotally mounted and adapted to rotate thereon, at least a point of each of said elements being in contact with a cam contour on another of said elements, and article-gripping means respectively associated with said elements and eccentrically positioned with respect to the axis of rotation of the respective elements and concentrically with each other and adapted to grip an object other than said mounting means.

9. In a device of the character described, the combination comprising mounting means, a plurality of elements pivotally mounted and adapted to rotate thereon, at least a point of each one of said elements being in contact, in certain position, with a cam contour on another of said elements, and article-gripping means respectively associated with said elements and eccentrically positioned with respect to the axis of rotation of the respective elements and concentrically with each other, at least a point of each of said other elements being in certain positions in contact with a cam contour on one of said elements, all of said cams being so shaped that said gripping means are always concentric.

10. A chuck for gripping the inner periphery of hollow articles comprising a chuck body, and three gripping clamps mounted for oscillation in said chuck body and subjected to the influence of springs, said springs tending to move said clamps toward a gripping position, said clamps having cylindrical faces rolling on each other, cylindrical centering faces touching each other and article-gripping faces eccentric with each clamp.

11. In a device of the character described, the combination comprising mounting means, a plurality of rotatable elements pivotally mounted thereon, each of said elements having a contour and each of said elements also having a contact point which is not a part of said contour, said contours and said points being so arranged that in certain positions of said elements the point on one element contacts with the contour on a second element, but the point on the second does not contact the contour on the first, and in certain other positions the point on the one element does not contact with the contour on the second but the point on the second does contact with the contour on the one element whereby the movements of said elements are interrelated, and article-gripping means respectively associated with said elements and eccentrically positioned with respect to the axis of rotation of the respective elements.

STEPHAN BRÜCK.